United States Patent [19]

Müller

[11] Patent Number: 5,322,653

[45] Date of Patent: Jun. 21, 1994

[54] METHOD OF REPAIRING BURIED SEWAGE PIPES

[76] Inventor: Hans Müller, Brauergildestrasse 5, D-4938 Schieder Schwalenberg 2, Fed. Rep. of Germany

[21] Appl. No.: 894,066

[22] Filed: Jun. 5, 1992

[51] Int. Cl.$^5$ .................. B28B 7/32; B32B 31/00; B32B 35/00; F16L 55/18

[52] U.S. Cl. .................. 264/35; 138/97; 138/98; 156/94; 156/156; 156/294; 264/36; 264/136; 264/257; 264/258; 264/263; 264/266; 264/269; 264/314; 264/335; 405/146; 405/150.1; 405/157

[58] Field of Search .................. 264/31–36, 264/134, 136, 137, 257, 258, 269, 313, 314; 405/146, 150, 154, 157, 150.1; 138/97, 98; 156/94, 98, 156, 294

[56] References Cited

U.S. PATENT DOCUMENTS

| | | | |
|---|---|---|---|
| 570,165 | 10/1896 | Greenfield | 156/82 |
| 1,605,782 | 11/1926 | Rota . | |
| 3,511,734 | 5/1970 | Darrow | 264/314 X |
| 3,579,400 | 5/1971 | Kanyok et al. | 264/314 X |
| 4,348,247 | 9/1982 | Loyd et al. | 156/156 |
| 4,353,964 | 10/1982 | Grimm et al. | 264/39 X |
| 4,361,451 | 11/1982 | Renaud | 156/294 X |
| 4,394,202 | 7/1983 | Thomas et al. | 264/36 X |
| 4,581,247 | 4/1986 | Wood | 156/294 X |
| 4,671,840 | 6/1987 | Renaud | 264/269 X |
| 4,680,066 | 7/1987 | Wood | 156/294 X |
| 4,681,783 | 7/1987 | Hyodo et al. | 138/98 X |
| 4,923,541 | 5/1990 | Burger | 264/314 X |
| 4,995,929 | 2/1991 | Menzel | 156/294 X |
| 5,009,737 | 4/1991 | Lescaut | 156/294 X |
| 5,030,493 | 7/1991 | Rich | 264/36 X |
| 5,042,532 | 8/1991 | Gilleland | 138/98 |
| 5,044,405 | 9/1991 | Driver et al. | 264/269 X |
| 5,049,003 | 9/1991 | Barton | 138/97 X |
| 5,106,440 | 4/1992 | Tangeman | 264/314 X |

Primary Examiner—Karen Aftergut
Attorney, Agent, or Firm—Darby & Darby

[57] ABSTRACT

A method of repairing a damaged (e.g., cracked) portion of a buried sewage pipe by permeating one or more layers of fibrous material with a hardenable plastic compound (such as epoxy resin), convoluting the thus obtained mat around a radially expandible length of hose to permit frictional engagement between the internal surface of the mat and the external surface of the hose, introducing the hose into a selected defective portion of the pipe, expanding the hose and the convoluted mat so that the mat engages the internal surface of the pipe, deflating the hose, and withdrawing the hose from the pipe, preferably after the plastic compound has set wherein a film of polyethylene is inserted between the external surface of the hose and the internal surface of the convoluted mat to enhance friction and to thus compel the hose to turn in the course of the expanding step. Expansion of the hose results in expulsion of some plastic compound beyond the peripheral surface of the convoluted mat; such compound bonds the expanded convoluted mat to the pipe and at least partially fills the crack or cracks in the adjacent portion of the pipe. Some plastic compound is also expelled at the axial ends of the convoluted mat to form a smooth transition between the internal surface of the pipe and the internal surface of the expanded convoluted mat.

15 Claims, 9 Drawing Sheets

METHOD OF REPAIRING BURIED SEWAGE PIPES

BACKGROUND OF THE INVENTION

The invention relates to improvements in methods of patching up defective conduits for liquids, particularly to improvements in methods of patching up sewage pipes. Still more particularly, the invention relates to improvements in patching up of cracked and/or otherwise damaged pipes from within while the pipes are buried in soil or another material.

German Pat. No. 39 22 351 A1 discloses a method of restoring the integrity of portions of buried pipes with a resin-impregnated single-layer mat of fibrous material. The mat is convoluted onto a radially expandible hose which is expanded from within to urge the mat against the internal surface of the defective portion of a pipe. The marginal portions of the mat which surrounds the expandible carrier overlap each other to thus ensure that the convoluted mat continues to remain a tubular body upon completion of the expanding operation. The arrangement is or should be such that the marginal portions of the mat overlap each other by an angle of approximately 90° when the step of expanding the hose (and the surrounding mat) is completed.

The expandible hose for the convoluted mat remains at a standstill in the course of the expanding step, i.e., while the mat is being expanded radially outwardly toward and into engagement with the internal surface of a defective portion of a pipe. The overlapping marginal portions of the mat are in frictional engagement with and rub against each other while the hose and the convoluted mat thereon are subjected to radial expanding action by a pressurized fluid which is admitted into the hose. Furthermore, radial expansion of the hose entails a movement of the expanding mat relative to the hose. Therefore, the resin which permeates the convoluted mat does not issue at the periphery and/or beyond the axial ends of the expanding mat. At any rate, the quantity of resin which is expelled from the mat radially outwardly and/or axially is negligible and, therefore, the force with which the expanded mat adheres to the internal surface of the pipe is relatively small. Some radial compression of the single layer of resin-impregnated mat takes place only when the expanding step is completed and the expanded hose continues to exert pressure against the expanded mat, i.e., the single layer of the mat is caused to reduce its thickness and to be relieved of some resin only when the damaged portion of the pipe is called upon to act as an anvil or back support for the expanded mat.

A drawback of the aforedescribed prior proposal is that the damaged portion of the pipe (the damaged portion is likely to exhibit one or more cracks which permit the conveyed flowable material (such as raw sewage) to escape from the buried pipe and to penetrate into the soil around the pipe) must stand quite pronounced radially outwardly oriented stresses which are applied by the expanded tubular mat and are likely to cause additional damage, such as widening of the cracks or complete disintegration of the pipe into several discrete fragments. Moreover, the quantity of resin which is expelled from the tubular mat upon completion of the expanding step is relatively small so that the resin (if any) which is expelled from the mat cannot fill the cracks and cannot ensure reliable bonding of the expanded tubular mat to the adjacent internal surface of a damaged portion of the pipe.

OBJECTS OF THE INVENTION

An object of the invention is to provide a simple and inexpensive but reliable method of patching up defective zones of buried conduits for sewage or the like.

Another object of the invention is to provide a method which ensures that a high percentage of a hardenable plastic compound (such as an epoxy resin) is expelled from the tubular mat even prior to the expanding step to thus ensure reliable sealing of one or more cracks as well as reliable adherence of the expanded mat against the internal surface of a damaged or defective portion of a conduit.

A further object of the invention is to provide a novel and improved method of forming a mat which is impregnated with a hardenable plastic sealing and bonding compound.

An additional object of the invention is to provide a novel and improved method of expanding a tubular mat and its carrier so that the mat can reliably engage and remain strongly attached to the internal surface of a defective portion of a buried sewage pipe or another conduit.

Still another object of the invention is to provide a novel and improved method of uniformly impregnating a mat with a hardenable sealing and bonding compound.

Another object of the invention is to provide a method which ensures proper impregnation and installation of a mass of fibrous material within a short interval of time.

A further object of the invention is to provide a novel and improved method of radially expanding one or more hoses each of which can be surrounded by a discrete mat.

An ancillary object of the invention is to provide a method according to which a single mat can be used to simultaneously seal two or more holes, cracks or analogous deficiencies in a conduit while the conduit is buried underground.

An additional object of the invention is to provide a novel and improved apparatus for the practice of the above outlined method.

Still another object of the invention is to provide a novel and improved mechanism for transporting a carrier and a mat around the carrier into a defective conduit.

A further object of the invention is to control friction between a radially expandible and contractible carrier and a mat which is convoluted around the carrier.

SUMMARY OF THE INVENTION

The invention is embodied in a method of patching up or repairing from the inside at least one selected portion of an at least partially buried conduit (such as a sewage pipe) wherein the at least one selected portion exhibits at least one crack or an analogous defective zone which requires sealing or filling in. The improved method comprises the steps of impregnating a mat containing at least one layer of fibrous material with a hardenable plastic substance (such as a compound and hereinafter called compound), convoluting the impregnated mat around a radially expandible and contractible hose or an analogous hollow tubular carrier to form a tubular shell having overlapping portions and first and second axial ends, establishing pronounced friction between the carrier and the shell so that radial expansion of the carrier entails simultaneous radial expansion of the shell with attendant slippage of overlapping portions of the radially expanding shell relative to each other, introducing the carrier and the shell into the at least one selected portion of the conduit, expanding the carrier and the shell in and thus causing the shell to contact the at least one selected portion of the conduit with (a) attendant flow of hardenable compound into the at least one defective zone and (b) rotation of the carrier relative to the conduit, contracting the expanded carrier with resulting separation of the contracted carrier from the expanded shell, withdrawing the contracted carrier from the shell, and causing or permitting the hardenable compound to set.

The expanding step further comprises pressing the overlapping portions of the shell against each other and expelling hardenable compound beyond at least one axial end of the expanded shell. The arrangement is preferably such that the outer diameter of the carrier prior to the expanding step is considerably less than the inner diameter of the conduit.

The expanding step preferably comprises expanding the tubular carrier from within with a gaseous and/or hydraulic fluid. The convoluting step can include converting the impregnated mat into a shell having an axial length such that the carrier extends beyond the axial ends of the shell.

The step of establishing friction between the carrier and the shell can comprise introducing a suitable foil, for example, a polyethylene foil, between the mat and the carrier. The introducing step is or can be carried out subsequent to the impregnating step and prior to the convoluting step. The convoluting step of such method can further comprise converting the foil into a tubular body which surrounds and extends axially beyond the carrier.

Alternatively, the step of establishing friction can comprise introducing a multilayer foil (e.g., a multilayer polyethylene film) between the mat and the carrier. The convoluting step then comprises converting the multilayer film or foil into a tubular body having axial ends extending beyond the shell and surrounding the carrier, and such method preferably further comprises the step of affixing the ends of the tubular body to the carrier to prevent unwinding of the tubular body and exposure of the carrier during radial expansion.

The convoluting step can comprise converting the mat into a spiral having a plurality of turns, for example, a plurality of full turns plus a portion of a turn. If the mat comprises a plurality of overlapping layers of fibrous material, the convoluting step can comprise converting the mat into a spiral having a plurality of turns and each such turn has two or more strata.

The expanding step can comprise introducing into the carrier a fluid having a pressure which is a function of a plurality of parameters including the extent of required expansion of the carrier to bias the shell against the internal surface of the conduit with a predetermined force, and the nature of fibrous material in the mat. A further parameter can include the circumferential length of the convoluted mat.

The fibrous material of the mat can be selected from the group consisting of glass fibers, carbon filaments and KEVLAR (Trademark) around fibers.

The impregnating step can comprise applying hardenable plastic compound over a plurality of coherent or discrete layers of fibrous material, superimposing the layers upon each other, confining the superimposed layers and the applied plastic compound in an envelope, for example, an envelope of polyethylene foil, and applying to the envelope external forces in directions to effect penetration of plastic compound into the layers, preferably to such an extent that the entire mat is permeated with the plastic compound. The foil of the envelope can transmit light, and the step of applying forces can include manually spreading the plastic compound within the envelope by resorting to a tool which at least resembles a rolling pin.

The novel features which are considered as characteristic of the invention are set forth in particular in the appended claims. The improved method itself, however, together with additional features and advantages thereof, will be best understood upon perusal of the following detailed description of certain presently preferred specific embodiments of the method with reference to the accompanying drawing.

DESCRIPTION OF PREFERRED EMBODIMENTS

Figure 1A:
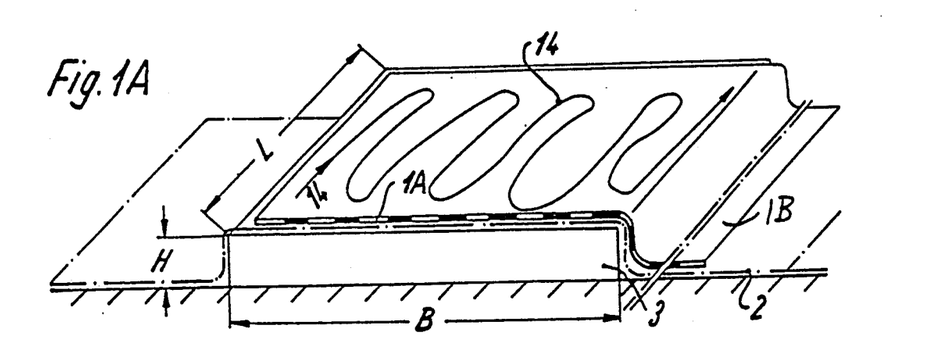
FIG. 1A is a schematic perspective view of the step of applying a hardenable plastic compound over one half of a layer of fibrous material while the one half of the layer overlies an incomplete envelope of light transmitting plastic foil and the foil overlies a flat base.
Figure 1B:
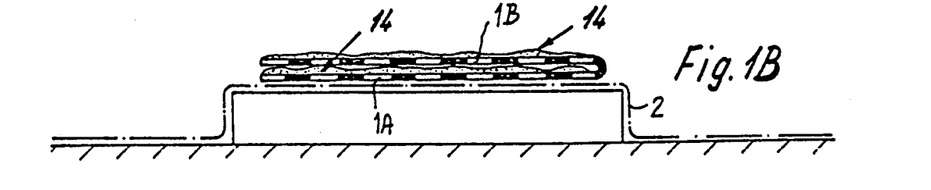
FIG. 1B is a schematic front elevational view showing the other half of the layer folded over the one half to form a multilayer mat.
Figure 1C:
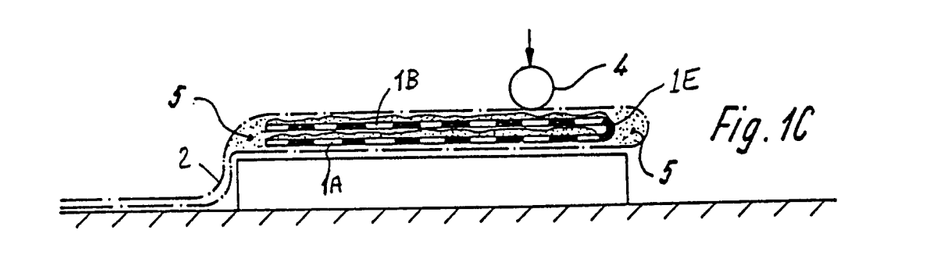
FIG. 1C is a similar schematic front elevational view and shows the layers of the mat confined in an envelope including the plastic foil, and further showing a rolling pin which is being used to spread out the plastic compound in the envelope and to thus permeate the mat with such compound.
Figure 1D:
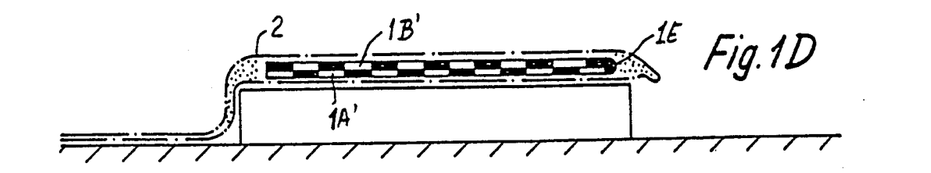
FIG. 1D illustrates the structure of FIG. 1C upon completion of the spreading step.

Referring first to FIGS. 1A to 1E, there is shown a square or rectangular plate-like base or platform 3 having a length L, a width B and a height H and being overlapped by a light-transmitting plastic foil 2, preferably a foil of polyethylene. The width of the foil 2 equals or at least slightly exceeds the length L of the base 3, and the length of this foil at least equals but preferably at least slightly exceeds 2B. The foil 2 is overlapped by an elongated layer of fibrous material, and such layer includes a first section or half 1A fully overlying the foil portion on the top face of the base 3, and a second section or half 1B which is integral with the section 1A and overlies the foil 2 to the right of the base 3. The dimensions of the base 3, the width of the foil 2 and the combined length of the layer including the sections 1A, 1B are selected with a view to ensure satisfactory patching up of a selected (defective) portion of a buried conduit 12 (see, for example, FIGS. 3A, 3B and 4A), e.g., a sewage pipe which is at least partially buried in soil at a selected level below the ground. FIG. 1A further shows the application of a stream of hardenable plastic compound 14 to the exposed upper side of the section or half 1A of the layer of fibrous material.

When the application of plastic compound 14 over the section 1A is completed, the section 1B is folded over the section 1A (FIG. 1B) so that the two overlapping sections form a twin-layer mat, and the upper side of the folded-over section 1B is provided with a selected quantity of hardenable plastic compound 14. The coatings of plastic compound 14 may but need not be uniform but the overall quantity of applied plastic compound should at least suffice to permit complete permeation of fibrous material of the mat including the sections or halves 1A and 1B. The length of the thus obtained mat equals or approximates B, and the mat has a width L.

The next step involves folding the non-overlapped portion or portions of the foil 2 over the coating of plastic compound 14 on top of the upper section 1B (see FIG. 1C) so that the foil 2 then forms an envelope which completely confines the mat and the two coats of plastic compound. A manually operated implement in the form of a rolling pin 4 is thereupon applied over the top sheet of the light transmitting envelope constituted by the foil 2 to spread out the plastic compound 14 in the two sections 1A and 1B and to thus convert such sections into layers 1A', 1B' (FIG. 1D) which are at least substantially permeated by (i.e., saturated with) hardenable plastic compound 14. At the same time, the implement 4 ensures that reasonably large accumulations of plastic compound (shown at 5 in FIG. 1C) gather at the two sides of the base 3, namely at the side which is adjacent the hinge joint 1E between the layers 1A', 1B' and at the side which is parallel to such hinge joint. The length B of the mat including the layers 1A', 1B' equals or approximates (preferably at least slightly exceeds) the axial length of the defective portion of a conduit 12, and the width L of the mat exceeds the circumference of the internal surface of the defective portion of the conduit which is to be patched up. For example, the width L of the mat of FIG. 1D can equal or approximate at least twice the circumference of the internal surface 12a of the defective portion of a conduit 12. The height H of the base 3 is selected with a view to permit movements of a hollow tubular hose-like carrier 6 to the position which is shown in FIG. 1E and in which the carrier overlies and is spaced apart from the mat including the layers 1A', 1B'.

One presently preferred hardenable compound 14 is an epoxy resin. A light transmitting foil 2 is preferred at this time because it enables the person or persons in charge to observe the initial, intermediate and final stages of spreading the compound 14 within the envelope including the foil 2 of FIGS. 1C and 1D. For example, the person or persons in charge can detect and eliminate pockets of entrapped air, isolated batches of non-permeated fibrous material and/or other irregularities which can be eliminated by causing the implement 4 to direct plastic compound toward and into the corresponding portions of the light transmitting envelope. Pockets of entrapped air can be eliminated by urging the bubbles of entrapped air (and/or any other entrapped gas) to enter the accumulations 5 of hardenable plastic compound adjacent the hinge joint 1E between the layers 1A', 1B' and adjacent the other side of the base 3.

Figure 1E:
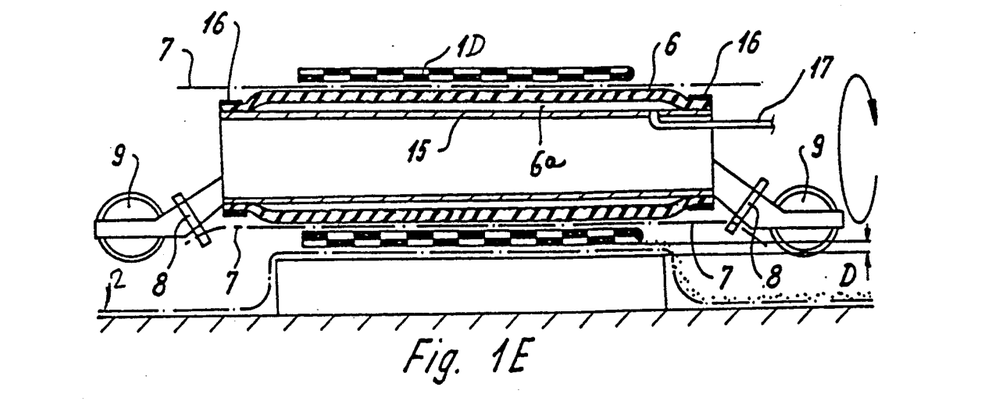
FIG. 1E is an axial sectional view of a radially expandible and contractible hose-like tubular carrier which is surrounded by a shell constituted by the convoluted mat and is separated from the latter by a film or foil of plastic material which establishes pronounced friction between the external surface of the carrier and the internal surface of the tubular shell constituted by the convoluted mat.

When the combined spreading and permeating step is completed, the envelope including the foil 2 is opened up so that the mat including the coherent overlapping layers 1A', 1B' of fibrous material (which is permeated with the plastic compound) is accessible and is ready to be convoluted around the peripheral surface of the carrier 6 which is then maintained in the deflated or contracted condition of FIG. 1E.

Prior to proceeding with further description of FIG. 1E, reference will be had to FIGS. 2A to 2D which illustrate a series of different steps of making a multi-layer mat which is ready to be convoluted onto an expandible and contractible carrier of the type shown at 6 in FIG. 1E.

Figure 2A:
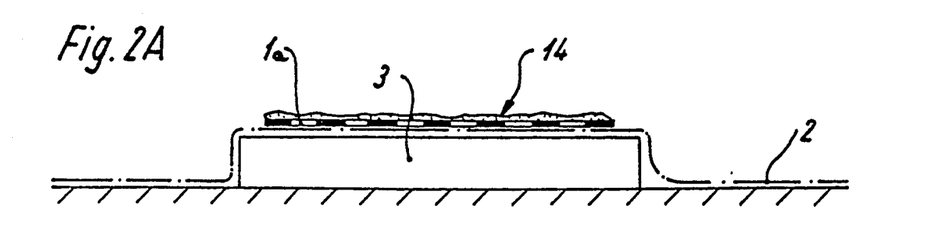
FIG. 2A is a front elevational view similar to that of FIG. 1A but showing an uneven coating of hardenable plastic compound on a relatively small first layer of fibrous material which overlies a plastic foil while the latter overlies a base.
Figure 2B:
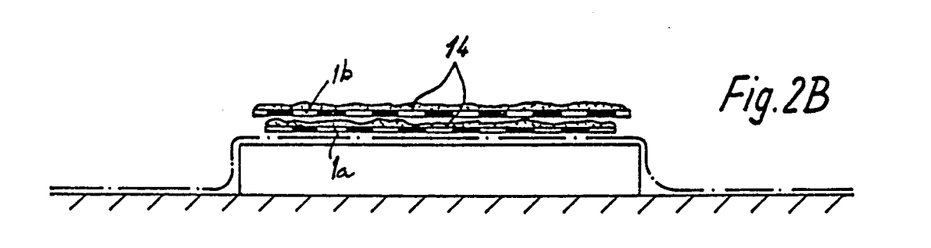
FIG. 2B shows the structure of FIG. 2A plus a discrete second layer of fibrous material on top of the first layer and an uneven coating of hardenable plastic compound on top of the second layer.
Figure 2C:
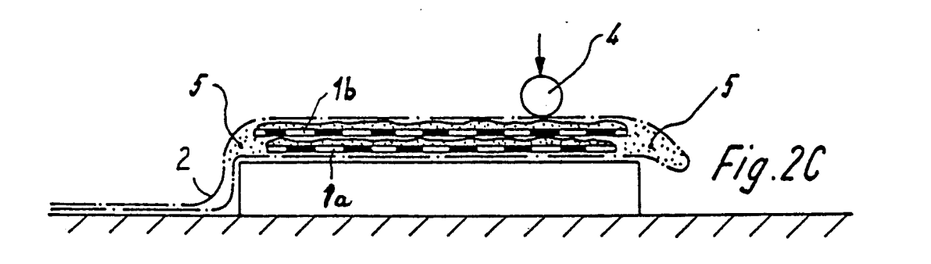
FIG. 2C illustrates the manner of spreading the plastic compound into the overlapping layers of FIG. 2B by means of a rolling pin which applies force through an envelope of light transmitting plastic foil.

FIG. 2A shows a discrete section or layer 1a of fibrous material overlying that portion of a light transmitting (transparent or translucent) foil 2 which overlies the upper side of the base 3. A uniform or non-uniform coat of hardenable plastic compound 14 is applied to the exposed upper side of the discrete section 1a. A second discrete section or layer 1b is thereupon placed on top of the coat of plastic compound 14 on the first section 1a, and the upper side of the section 1b is also coated with a uniform or non-uniform coat of hardenable plastic compound 14 (FIG. 2B). The foil 2 is thereupon folded over the thus obtained twin-layer mat to form an envelope (FIG. 2C) which completely confines the mat including the sections 1a, 1b and the two coats of plastic compound 14, and the thus entrapped mass of hardenable plastic compound is thereupon spread out by the implement 4 to permeate each and every portion of each of the two layers of the mat. Some plastic compound is forced beyond the mat to form accumulations 5 which are confined in the envelope including the appropriately folded foil 2. The envelope is then opened up (FIG. 2D) to afford access to the mat so that the mat including the permeated sections 1a' and 1b' can be convoluted onto a carrier 6 of the type shown in FIG. 1E.

Figure 2D:
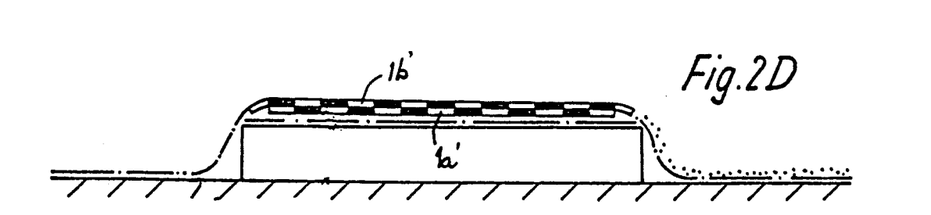
FIG. 2D illustrates the structure of FIG. 2C upon completion of the spreading step, with the envelope opened to expose the thus obtained twin-layer mat of fibrous material which is permeated with hardenable plastic compound.
Figure 2E:
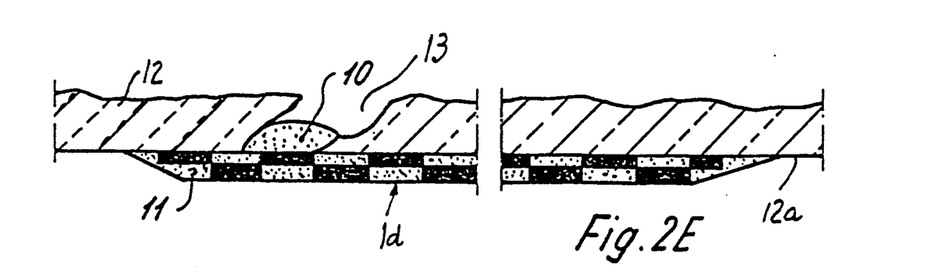
FIG. 2E illustrates a portion of a radially expanded shell made of the mat of FIG. 2D and adhering to the internal surface of a defective zone of a selected portion of a conduit of ceramic or other suitable material.

FIG. 2E shows a portion of a radially expanded shell 1D whose plastic fraction is already hardened and which adheres to the internal surface 12a of a conduit 12 at a location such that a certain quantity or filler (shown at 10) of hardened plastic compound has penetrated into and seals a crack 13 in the wall of the conduit 12. The reference character 11 denotes a ring of hardened plastic compound at the respective axial end of the radially expanded and stabilized shell 1d; such ring establishes a reliable seal against penetration of conveyed fluid medium (e.g., sewage) between the internal surface 12a of the conduit 12 and the external surface of the expanded shell 1d. In addition, the ring 11 provides a smooth transition between the internal surface 12a and the internal surface of the expanded shell 1d.

Figure 3A:
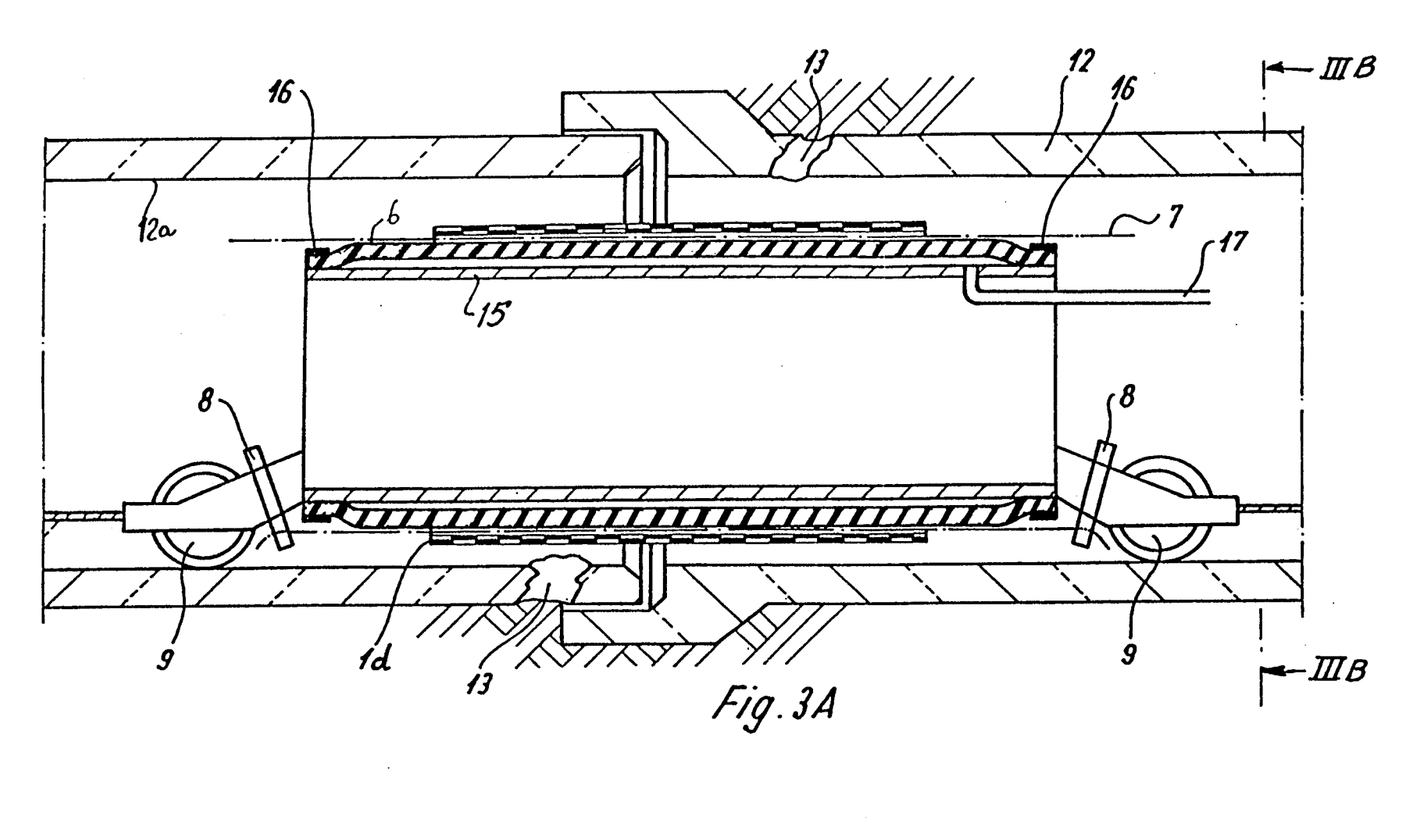
FIG. 3A is an axial sectional view of a portion of a defective conduit and an axial sectional view of a still contracted carrier which is surrounded by a shell of fibrous material and is separated therefrom by a film of friction promoting plastic material, the carrier and the shell being ready for radial expansion in order to force the shell against the internal surface of the defective portion of the conduit.
Figure 3B:
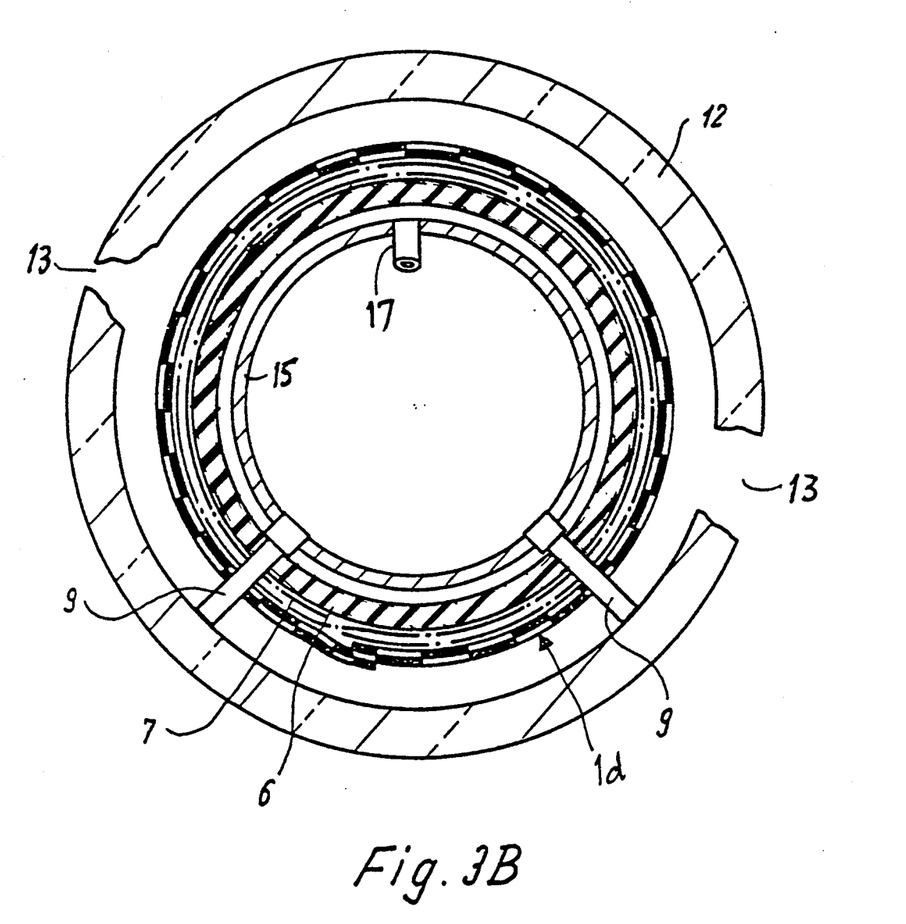
FIG. 3B is an enlarged partly end elevational and partly sectional view substantially as seen in the direction of arrows from the line IIIB—IIIB in FIG. 3A.

Referring again to FIG. 1E, the means for moving the expandible and contractible carrier 6 into and out of a selected portion of a conduit 12 comprises a cylindrical metallic core 15 which is surrounded by the carrier and is provided with two pairs of legs 8 carrying rollers or wheels 9 (see also FIGS. 3A and 3B). The carrier 6 can be made of a strongly pressure- and wear-resistant elastomeric material, e.g., a length of rubber pipe or hose or a length of hose consisting of an elastomeric plastic material. The elastomeric material of the carrier 6 can but need not always be reinforced in any well known manner, depending upon the magnitude of stresses which must be applied to the carrier in order to expand the latter toward the internal surface 12a of a conduit 12 and to urge the thus expanded shell 1D into requisite engagement with the internal surface 12a of the conduit which is in need of repair (patching up).

The axial ends of the carrier 6 are sealingly secured to the adjacent portion of the external surface of the cylindrical core 15, e.g., by strips or bands 16 of textile or other suitable material which ensures that an annular chamber 6a between the carrier and the core is sealed from the atmosphere. The medium which is used to expand (inflate) the carrier 6 between the sealed axial ends can be a hydraulic fluid or a gaseous fluid (e.g., air). The means for admitting pressurized fluid into the chamber 6a comprises a pipe 17 which is connected to a suitable source (not shown) of pressurized fluid and contains one or more valves (not shown) serving to regulate the admission of fluid into, and the evacuation of spent fluid from, the chamber 6a.

Each layer of the mat 1D can contain a roving of glass fibers and a stratum of binder-free glass fibers which is sewn to the roving with a thread of polyester. A highly satisfactory mat can be obtained from one or more layers each of which includes a first stratum (a roving containing 550 grams of glass fibers per square meter) and a second stratum (e.g., a cloth or cushion) containing 450 grams of glass fibers per square meter. The thickness of the mat 1D need not exceed 1 mm. It is presently preferred to employ E-CR glass because such material is capable of standing the corrosive influence of fluids which are conveyed in the patched up conduit 12.

As already mentioned above, the hardenable plastic compound 14 can be an epoxy resin which can set at normal temperatures or which must be heated in order to initiate or promote setting. The plastic compound can contain one or more additives in order to enhance or impart certain desirable characteristics. For example, the plastic compound can contain a suitable coupling agent which enhances the ability of the mat shell 1D to adhere to the wet internal surface 12a of a conduit 12. This is particularly important when the improved method is practiced to patch up from within a conduit which is at least partially buried in the ground and serves to convey liquid sewage and/or other hydraulic fluids. It is also advisable to admix into the plastic compound at least a small quantity of a deaerating agent which reduces the likelihood of inclusion of pockets of a gaseous fluid in the mat shell 1D. Each of the just discussed additives can be of the type readily available on the market.

The strength of fiber-reinforced plastic materials is higher if the percentage of oriented fibers therein is higher. This holds true for glass fibers, carbon filaments as well as for filaments of KEVLAR (Trademark) aramid. These are presently preferred fibers and filaments in the layers of a mat which is to be converted into the mat shell 1D. It is desirable and advantageous to employ a relatively strong or very strong but also very thin shell which can stand the stresses tending to widen the crack or cracks 13 in a damaged portion of a buried conduit. This will be appreciated by bearing in mind that an installed shell reduces the effective inner diameter of the repaired portion of a conduit 12 and thus constitutes a flow restrictor. A thin or extremely thin shell which is still capable of properly sealing a defective portion of a buried conduit 12 constitutes a rather negligible flow restrictor which does not affect, or does not appreciably affect, the flow of a conveyed flowable material (such as sewage) in the repaired conduit.

When a suitable detector (e.g., a television camera 18 shown in FIG. 6) has ascertained the presence of a defective portion of a buried conduit 12, a mat (1A'+1B' or 1a'+1b') of requisite dimensions and permeated by a suitable hardenable plastic compound 14 is convoluted around a contracted carrier 6 so that the resulting mat shell 1D forms a spiral having at least a little more than one complete turn, preferably two complete turns plus at least a portion of a further turn. Each turn can consist of a single layer or of two or more overlapping layers. A winch or another suitable moving device is thereupon employed to manipulate the carrier 6 and the mat shell 1D thereon in a buried conduit 12 so that the shell is introduced into the defective portion or zone of the conduit and is properly located by observing its image on the screen of the camera 18. The winch can be replaced by a motorized television camera which automatically transports the carrier 6 in a buried conduit 12 and brings the mat shell 1D to a halt when the latter is properly positioned within the confines of a defective portion of the conduit which is in need of repair. The pipe 17 is connected to a source of pressurized hydraulic or gaseous fluid by a hose 117 (FIG. 6), and the admission of pressurized fluid into and from the chamber 6a within the carrier 6 can be controlled by one or more, valves. Inflation or expansion of the carrier 6 and of the mat shell 1D around it is completed when the external surface of the expanded shell comes into requisite sealing contact with the internal surface 12a of the conduit 12. The interval which is required by the plastic compound 14 in and on the confined and expanded mat shell 1D to set can be selected in advance with a high degree of accuracy. Thus, if such interval is relatively short (e.g., by filling the chamber 6a with a hot gaseous or hydraulic fluid), the carrier 6a can be deflated (contracted) and withdrawn from the thus patched up conduit 12 after a short or very short period of time.

It has been found that highly satisfactory results can be achieved if a film 7 between a carrier 6 and the mat shell 1D around it contains one but preferably several layers (e.g., two layers) of suitable foil, such as polyethylene foil. The ends of the film 7 (which is convoluted around and confines the entire carrier 6) are sealingly connected to the respective axial ends of the carrier to ensure that the convoluted film cannot completely unwind in response to radial expansion of the carrier and of the mat shell 1D which surrounds the carrier. The means for sealing the ends of the convoluted film 7 at the axial ends of the carrier 6 can comprise adhesive-coated straps, bands or the like. Alternatively, the ends of the innermost layer or of each layer of the convoluted film 7 can be secured to the legs 8 for the wheels 9.

In order to convert a mat 1A'+1B' or 1a'+1b' into a shell 1D, the carrier 6 can be steered to assume a position at the front end face of the base 3 which supports the foil 2, the mat 1A'+1B' or 1a'+1b' and the film 7, the carrier 6 being adjacent the neighboring edge portion of the mat. The carrier 6 is then caused to roll along the upper side of the mat in a direction away from or toward the observer of FIG. 1D or 2D so that the mat is converted into the shell 1D which closely follows the outline of the still contracted (deflated) carrier. The film 7 can be convoluted onto the carrier 6 prior to conversion of the mat into a shell 1D or is convoluted as a result of such conversion. The wheels 9 are out of the way during conversion of a mat into a shell because they are outwardly adjacent the respective axial ends of the carrier 6. A suitable vehicle for the carrier 6 can comprise a tubular core 15 of a metallic or other suitable material and four wheels 9, two at each axial end of the core. The mounting and the diameters of the wheels 9 are selected in such a way that the internal surface 12a of the pipe 12 cannot be contacted by the carrier 6 and/or by the shell 1D thereon (see FIG. 1E). The minimum distance between the external surface of the shell 1D of FIG. 1E and the top face of the base 3 is shown at D.

The carrier 6 is ready to be introduced into a conduit 12, either by a winch or by a motorized television camera 18, as soon as the step of convoluting the mat around the carrier is completed. The introduction takes place by way of a duct, such as one of the ducts 112 shown in FIG. 6.

When the carrier 6 and the mat shell 1D thereon are moved off the base 3 of FIG. 1E, the foil 2 is folded in such a way that its surface which was in contact with hardenable plastic compound 14 is located at the inside of the resulting package. The package is thereupon lifted off the base 3 and is disposed of in an ecologically acceptable manner. Soft fragments or accumulations of plastic compound harden within a relatively short interval of time (e.g., 2-3 hours) to simplify acceptable disposal of the package including the folded-together foil 2 and its hardened contents.

The carrier 6 and the shell 1D thereon are ready to be introduced into the conduit 12, i.e., into a defective portion of the conduit. Such introduction is facilitated by the moving means including the tube 15 and its wheels 9 and by observing the progress of the carriage 6 on the screen of the camera 18. The hose 117 then admits pressurized gaseous or hydraulic fluid into the chamber 6a via pipe 17 so that the carrier 6 expands with the shell 1D thereon. Expansion of the shell 1D results in a sliding movement of overlapping portions of the layers 1A', 1B' or 1a', 1b' relative to each other. For example, if the inner diameter of a conduit 12 is 400 mm, the outer diameter of the carrier 6 in unexpanded condition can be in the range of 350 mm, i.e., considerably less than the inner diameter of the conduit. The circumferential length of the convoluted shell 1D can be in the range of 350 mm times $\pi$ times $2=2200$ mm, i.e., the unexpanded shell 1D is a spiral having two complete turns. The circumferential length of the internal surface 12a of the conduit 12 having an inner diameter of 400 mm is 1256 mm. Thus, when the shell 1D is expanded into contact with the internal surface 12a, the extent of overlap of its turns is reduced from 2 to 1.75 ($2200:400 \times \pi = 1.75$). The circumferential length of the unexpanded shell 1D is calculated by taking into consideration the inner diameter of the defective conduit 12 and the desired extent of overlap of the turns of the expanded spirally convoluted shell.

FIG. 3A shows the carrier 6 and the shell 1D in the defective portion of a conduit 12. The defective portion includes the joint between two neighboring sections of the conduit 12, and such defective portion has two cracks 13, one in each of the two sections. The carrier 6 is yet to be expanded, i.e., the external surface of the shell 1D is spaced apart from the internal surface 12a of the conduit. The film 7 is disposed between the unexpanded carrier 6 and the internal surface of the shell 1D.

FIG. 3B shows that the conduit section which is shown therein can exhibit additional cracks 13 which can be sealed by a second shell 1D or by utilizing a longer shell 1D in lieu of the shell 1D, which is shown in FIGS. 3A and 3B.

Figure 3C:
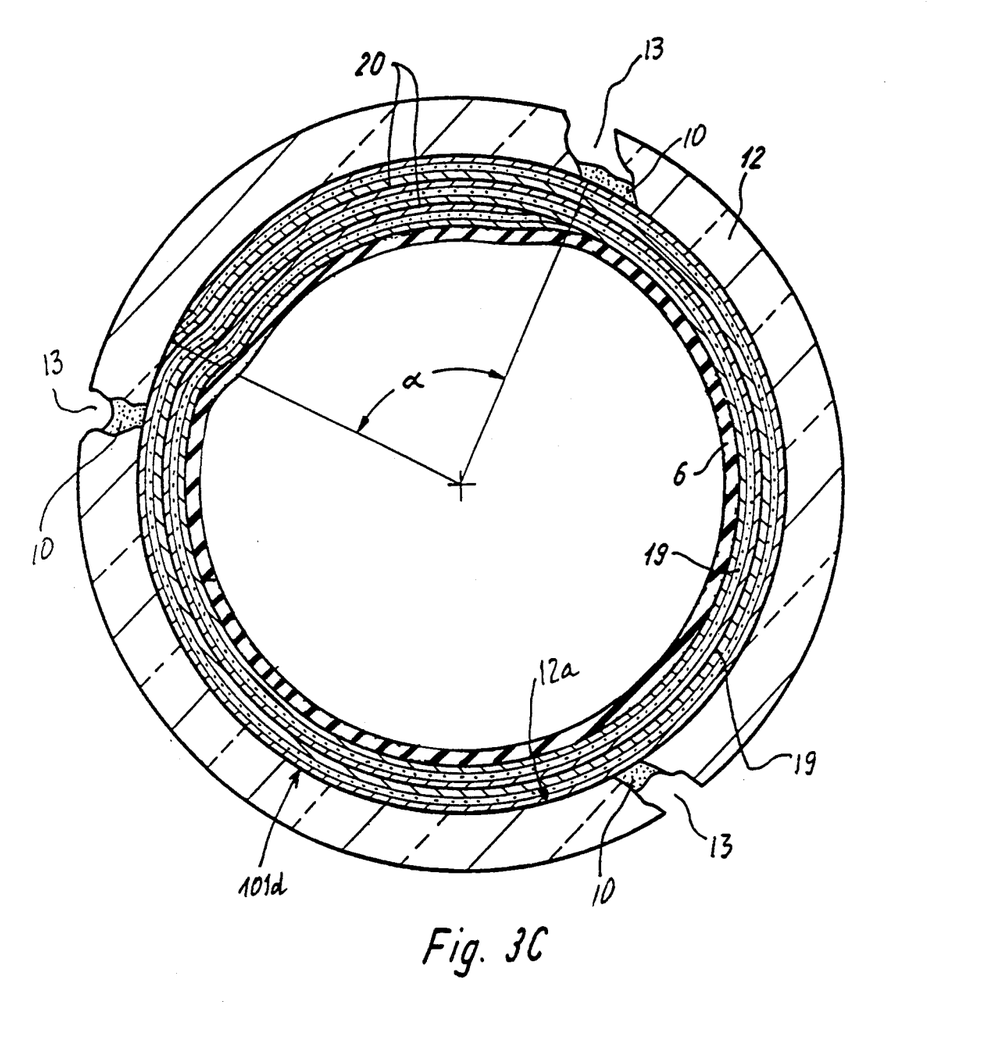
FIG. 3C is a transverse sectional view of a radially expanded shell which constitutes a spiral and is made of a multi-layer mat of fibrous material, the expanded shell sealingly engaging the internal surface of the defective portion of a conduit and the plastic compound filling portions of cracks in the conduit.

FIG. 3C shows an expanded spiral shell 101D which has two complete turns plus a portion of a third turn upon completion of the expanding step. The extent of overlap between the full outer turn and the portion of the third turn is indicated by the angle alpha. Each turn of the expanded shell 101D consists of two layers. The partial turn is adjacent the internal surface 12a of the conduit 12 which exhibits three cracks 13. Each of these cracks is partially filled with a mass 10 of hardened plastic compound.

It is equally within the purview of the invention to patch up a first selected defective portion of a conduit 12 with a shell 1D or 101D, having a first thickness and to patch up a second defective portion of the same conduit with a shell having a different second thickness. Shells having different thicknesses can be obtained from one and the same starting material (such as the layer 1A+1B of FIG. 1A or the layers 1a, 1b of FIG. 2B) by appropriate selection of the dimensions of such layer. Thus, a convoluted shell can have one, two, three, four or even more complete turns plus (if necessary) a portion of a further turn. The pressure in the chamber 6a need not be changed in order to expand a relatively thin or a relatively thick shell 1D or 101D. Alternatively, shells having different thicknesses can be obtained by making such shells from mats having a desired number of layers or sections each of which is permeated with a hardenable plastic compound. Referring, for example, to FIG. 2B, the application of the layer or section 1b over the layer or section 1a can be followed by the application of a third layer or section over the layer or section 1b in order to increase the thickness of the mat which is shown in FIG. 2D and hence the thickness of the shell 1D which is shown in FIG. 2E. In many instances, the dimensions of the mat will be selected in such a way that the circumferential length of an expanded shell equals two times the circumference of the internal surface 12a of a conduit 12 which is in need of repair plus a portion of a third turn having a circumferential length of approximately 100 mm. This would result in the making of a shell 101D of the type shown in FIG. 3C.

The pressure of gaseous or hydraulic fluid in the chamber 6a during and immediately following expansion of the carrier 6 and of the shell thereon must be selected with a view to avoid further damage to a defective portion of the conduit 12. Thus, the pressure in the chamber 6a should be limited to the minimum pressure which still suffices to ensure reliable expansion of the shell into contact with the internal surface 12a of the conduit 12 and penetration of some hardenable compound 14 into the crack or cracks 13 without causing any, or any appreciable, widening of the cracks.

The magnitude of frictional forces between neighboring turns of a shell 1D or 101D can be calculated in advance, especially if the number of complete turns and the circumferential length of the portion of an additional turn (e.g., 100 mm) of the shell are known in advance. The overlapping portions of the spiral shell slide relative to each other during expansion of the shell with the carrier 6. Shifting of neighboring turns of a multi-layer shell takes place exclusively or practically exclusively in the region 20 (FIG. 3C) of overlap between the portion of the outermost (incomplete) turn and the adjacent complete turn 19 of the shell. Since the frictional forces can be calculated in advance, especially when a shell is to be expanded in a conduit 12 having a standard inner diameter and if such shell has a standard axial length, it is rather simple to calculate (in advance) that pressure of fluid in the chamber 6a which is needed to ensure predictable expansion of the shell without causing additional damage to the defective portion of the conduit. Furthermore, the establishment of an accurately determined fluid pressure in the chamber 6a ensures that the external surface of the expanded shell bears against the internal surface 12a of the defective portion of a conduit 12 with a predetermined force. The pressure of fluid in the chamber 6a is selected with a view to ensure that the neighboring turns of the spiral shell will slide relative to each other (at 20 in FIG. 3C) during expansion of the carrier 6 and that the expanded shell will bear upon the internal surface 12a with a preselected force.

Figure 4A:
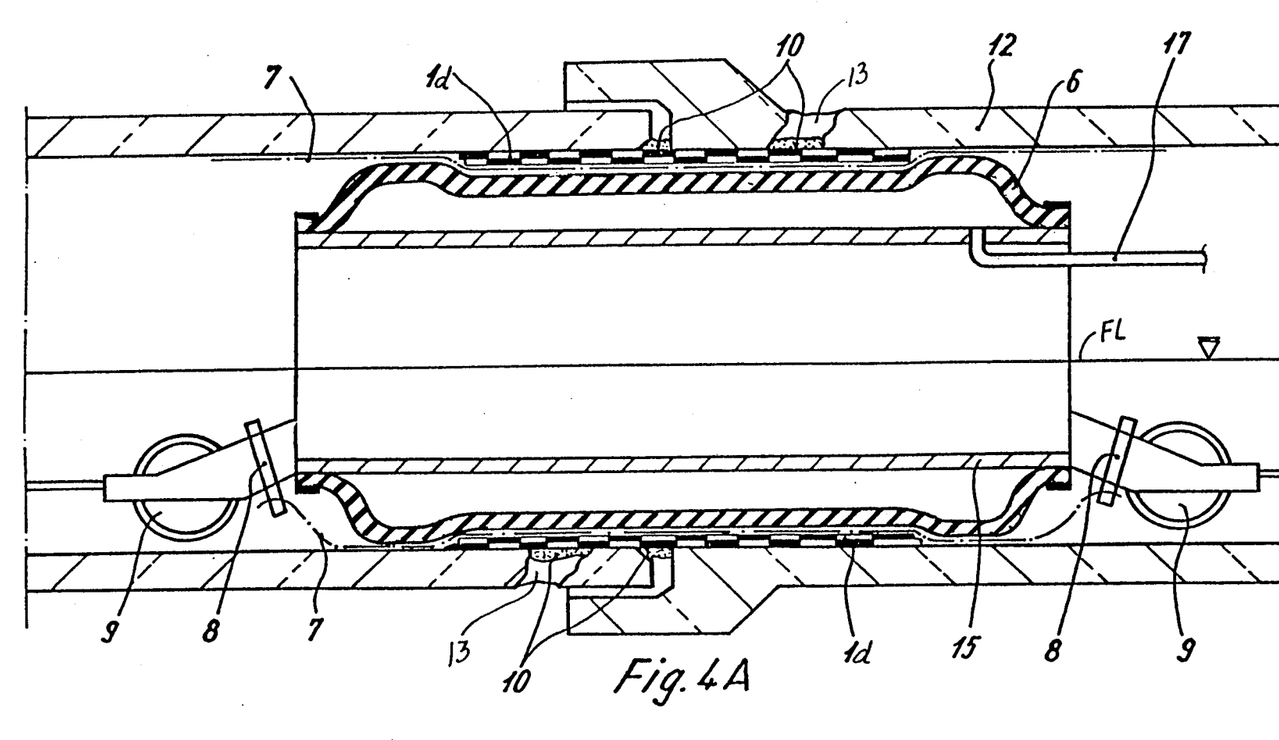
FIG. 4A is an axial sectional view similar to that of FIG. 3A but showing a carrier and a shell in radially expanded condition within a damaged portion of a conduit.
Figure 4B:
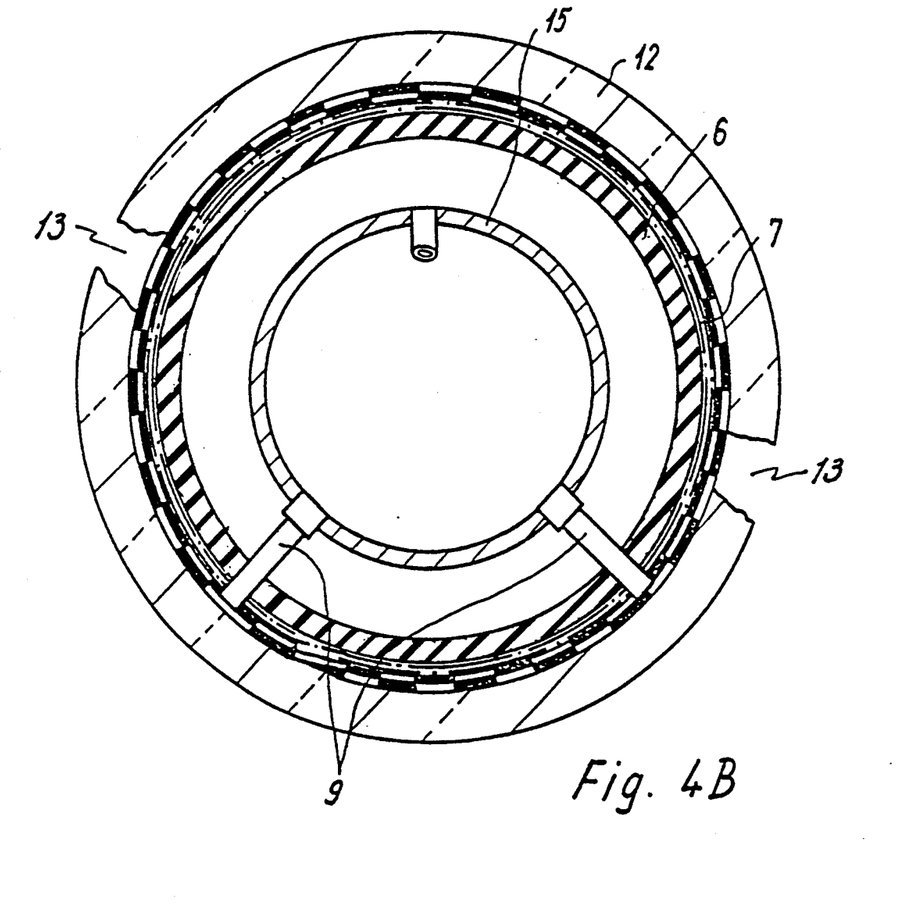
FIG. 4B is an enlarged transverse sectional view of the structure which is shown in FIG. 4A.

The carrier 6 turns about its axis during expansion as a result of admission of pressurized fluid into the chamber 6a. The extent of angular displacement of the carrier 6 in the course of the expanding step is a function of the difference between the diameters of the contracted (deflated) and expanded (inflated) carrier. It can be said that the carrier threads or screws itself into the defective portion of a conduit 12. Rotation of the carrier 6 during expansion is attributable to pronounced friction between the external surface of the carrier and the internal surface of the film 7 (such internal surface can constitute the internal surface of a single layer or the internal surface of the innermost layer of a film 7 which has been inserted between the carrier and the shell). The fully expanded carrier 6 and the shell thereon are shown in FIGS. 4A and 4B. The film 7 can be said to constitute a coupling which prevents turning of the carrier 6 relative to the adjacent turn of the shell and vice versa.

Expansion of the shell 1D or 101D with the expanding carrier 6 entails some reduction of the thickness of the shell which is attributable, at least in part, to sliding movement of neighboring turns of the spiral shell relative to each other. This results in expulsion of some plastic compound radially outwardly of the expanded shell and into the crack or cracks 13 in the surrounding defective portion of the conduit 12. Moreover, the plastic compound issues at the axial ends of the shell to establish a smooth transition zone at 11 (FIG. 2E).

The carrier 6 remains in expanded condition (FIGS. 4A and 4B) until after hardening of plastic compound 14 in the turns of the shell, in the crack or cracks 13, and at 11. As mentioned above, the interval which is required for hardening of the plastic compound 14 can be selected practically at will by appropriate selection of additives to the basic ingredient (e.g., epoxy resin) of the plastic compound and/or by appropriate selection of the temperature of the expanded shell upon completion of the implanting step.

Once the plastic compound 14 has set, the carrier 6 is deflated via pipe 17 and can be withdrawn from the conduit 12. Separation of the contracting carrier 6 from the expanded shell presents no problems because the film 7 adheres to the contracting carrier and is readily separable from the hardened plastic compound of the expanded shell. The contracted carrier 6 is then ready to be wheeled out of the repaired conduit 12 and to be put to renewed use or to be placed into storage. The transition between the axial ends of the expanded shell and the internal surface 12a of the repaired conduit 12 (as at 11 in FIG. 2E) is smooth and the thin or extremely thin expanded shell offers little or no resistance to the flow of conveyed fluid (e.g., sewage). The hardened plastic compound enhances the stability of the expanded shell and reliably seals the axial ends of the shell as well as the crack or cracks 13 around the shell.

It is advisable to interrupt the flow of fluid through the conduit 12 in the course of the repairing operation. The flow of fluid can begin as soon as the plastic compound on and in the expanded shell has set because the core 15 of the means for moving the carrier 6 in a conduit 12 offers little resistance to the flow of fluid through the repaired portion of the conduit. FIG. 4A shows the level (FL) of fluid in the repaired conduit 12 and in the core 15 upon completion of the repairing operation and prior to extraction or expulsion of the carrier 6.

Polyethylene foils 2 and films 7 are preferred at this time because they render it possible to utilize epoxy resins in a physiologically acceptable manner and also because such foils and films render it possible to readily gather and dispose of hardened epoxy resin in an ecologically acceptable manner. Thus, the person in charge need not come in contact with flowable plastic compound at any stage of the shell forming and/or implanting operation.

Figure 5:
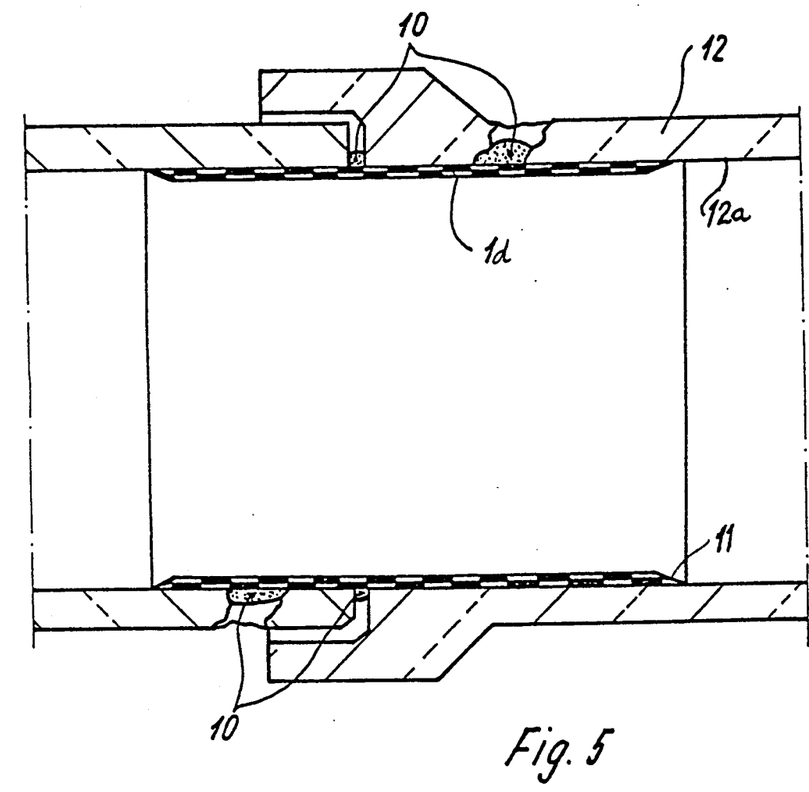
FIG. 5 is a fragmentary axial sectional view of a defective portion of a conduit and an axial sectional view of a radially expanded shell in the conduit.

FIG. 5 shows an installed shell 1D upon completion of the carrier withdrawing operation. As can be seen in FIG. 5, the rings 11 of hardened plastic compound at the axial ends of the expanded shell 1D establish a smooth transition between the internal surface of the shell 1D and the internal surface 12a of the conduit 12.

Figure 6:
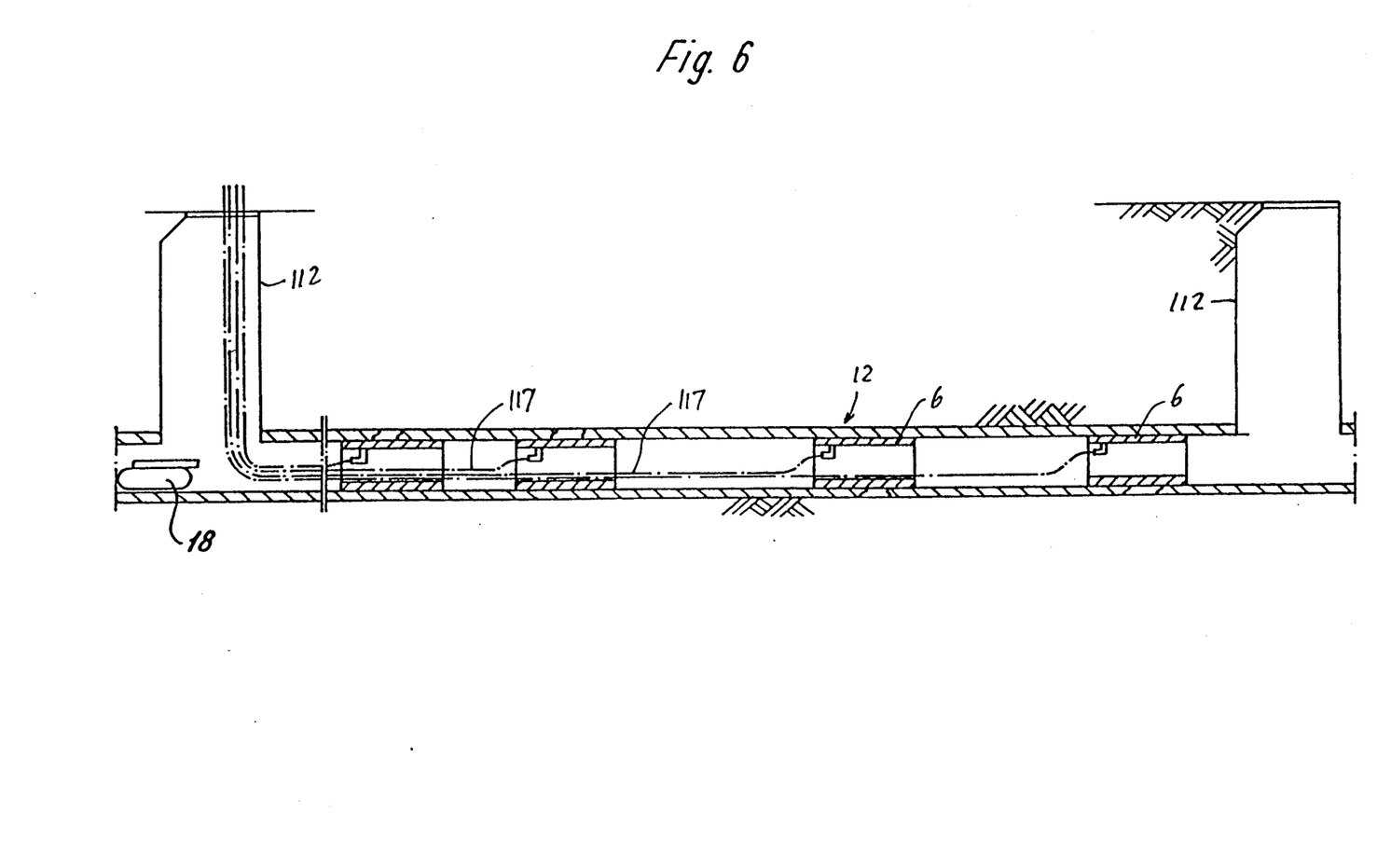
FIG. 6 is a schematic axial sectional view of a conduit and further shows a row of carriers each of which is confined in a different defective portion of the conduit.

FIG. 6 shows a section of a completely buried conduit 12 between two neighboring ducts or shafts 112 which afford access to adjacent portions of the conduit. It happens rather frequently that several portions of a conduit 12 between two ducts 112 are defective so that each must be patched up by a discrete shell of requisite axial length. FIG. 6 shows four expanded carriers 6 (with the means for moving the carriers omitted) in the conduit section between the two ducts 112. The hoses 117 which supply a pressurized gaseous or hydraulic fluid to and convey spent fluid from the chambers 6a for the respective carriers 6 are led through one of the ducts 112 and are connected to a suitable source of pressurized fluid. It will be noted that the hose 117 leading to the chamber for the rightmost carrier 6 of FIG. 6 extends through the other three carriers 6 in the conduit 12, that the hose 117 for admission of fluid into and for evacuation of fluid from the chamber for the next-to-the-rightmost carrier 6 extends through the two carriers which are adjacent the left-hand shaft 112, and so forth. Such introduction of hoses 117 into and through selected carriers 6 can be completed prior to introduction of the four illustrated carriers into the conduit 12. The television camera 18 advances with a freshly introduced carrier 6 (and a shell thereon) in order to facilitate proper positioning of the shell in the selected defective portion of the conduit 12, and the camera 18 is then retracted to the illustrated position preparatory to introduction of the next-following carrier 6 through one of the ducts 112. The carriers 6 can be expanded one after the other, i.e., during introduction of the next-following carriers, to thus shorten the period of time which is required for completion of the repairing operation between the two ducts 112. Expansion of each carrier 6 independently of the other carrier or carriers is possible because each of the chambers 6a can receive pressurized gaseous or hydraulic fluid through a discrete hose 117. Thus, the plastic compound which permeates a particular shell can harden while the other shell or shells are being introduced into and are being expanded in the respective defective portions of the conduit 12. This contributes significantly to rapid completion of a repairing operation which involves the introduction and expansion of two or more shells. Moreover, the inserted and expanded shell or shells do not interfere with introduction and expansion of one or more additional shells.

Foils and films of polyethylene are preferred in many instances because friction between the external surface of the expandible carrier of elastomeric material and the adjacent side of a polyethylene film is greater than friction between the impregnated innermost turn of the coiled shell 1D or 101D and the film 7 plus the friction between the layers of the shell. The dimensions of the film 7 are selected in such a way that the initial overlap between the turns of such film is sufficient to prevent direct contact between the shell and the carrier while the latter is being expanded in order to expand the shell against the internal surface 12a of a conduit 12. Thus the neighboring turns of the coiled film 7 can slide relative to each other during radial expansion of the carrier 6 but they continue to constitute a barrier between the external surface of the expanding carrier and the innermost turn of the coiled mat which constitutes the shell 1D or 101D. Since the end of that turn of the film 7 which is immediately adjacent the external surface of the carrier 6 does not slip relative to the carrier, while the overlapping portions of the film 7 do slip relative to each other during expansion of the carrier, the carrier is compelled to turn in the conduit in the course of the expanding step and, as already mentioned above, the extent of angular displacement of the expanding carrier is dependent upon the difference between the diameters of the unexpanded and expanded carrier, i.e., upon the difference between the circumferential lengths of the external surface of the carrier prior and subsequent to the expanding step. Turning of the carrier 6 in the conduit 12 (during expansion of the carrier) is desirable and advantageous because this ensures that the turns of the spirally convoluted shell are caused to slip relative to each other and the shell is densified during radial expansion toward as well as in response to engagement with the internal surface 12a of the conduit 12. Hardenable plastic compound 14 which is thereby expelled radially outwardly beyond the peripheral surface of the expanding shell comes into sealing contact with the internal surface 12a of the conduit 12 and penetrates into the crack or cracks 13 to establish a reliable sealing action as soon as the setting of plastic compound is completed.

An advantage of expulsion of at least some hardenable plastic compound 14 beyond the peripheral surface as well as at the axial ends of the radially expanding shell is desirable and advantageous because this renders it possible to avoid the application of excessive pressure against the internal surface 12a of the conduit 12. Thus, the conduit 12 is less likely to undergo additional damage (e.g., a widening of the crack or cracks 13) because at least a high percentage of hardenable plastic compound which is needed at 11 and in the crack or cracks 13 can be expelled from the shell during radial expansion of the carrier 6.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of patching up from within at least one selected portion of an at least partially buried conduit wherein the at least one selected portion exhibits at least one crack or analogous defective zone, comprising the steps of impregnating a mat containing at least one layer of fibrous material with a hardenable plastic compound; convoluting the impregnated mat around a radially expandable and contractible carrier having an external surface, to form a tubular mat shell having overlapping portions, an internal surface and first and second axial ends and to permit frictional engagement between the external surface of the carrier and the internal surface of the shell; establishing friction between the external surface of the carrier and the internal surface of the shell by introducing a polyethylene film therebetween before expansion of the carrier so that radial expansion of the carrier entails simultaneous radial expansion of the shell and slippage of the overlapping portions relative to each other; introducing the carrier, the polyethylene film and the shell into the at least one selected portion of the conduit; expanding the carrier, the polyethylene film and the shell in and against the at least one selected portion of the conduit to cause (a) flow of the hardenable plastic compound out of the mat into the at least one crack or analogous defective zone and (b) rotation of the carrier relative to the conduit due to pronounced friction between the external surface of the carrier and an adjacent internal surface of the polyethylene film, which polyethylene film constitutes a coupling which prevents turning of the carrier relative to an adjacent turn of the shell; contracting the expanded carrier to cause separation of the contracted carrier from the expanded shell; withdrawing the contracted carrier and the polyethylene film from the shell; and causing or permitting the hardenable compound to set thus ensuring reliable sealing of the at least one crack or analogous defective zone and ensuring reliable adherence of the expanded mat against the at least one selected portion of the conduit, wherein the convoluting step includes converting the impregnated mat into a shell having an axial length such that the carrier extends beyond the axial ends of the shell, and wherein the convoluting step further includes converting the film into a tubular body which surrounds and extends axially beyond the carrier.

2. The method of claim 1, wherein said expanding step further includes pressing the overlapping portions against each other and expelling hardenable compound beyond at least one axial end of the expanded shell.

3. The method of claim 1 of patching up at least one selected portion of an at least partially buried conduit having a predetermined inner diameter, wherein said convoluting step includes winding the impregnated mat around the carrier having prior to said expanding step an outer diameter considerably less than said inner diameter, said expanding step including expanding the carrier from within with a pressurized fluid.

4. The method of claim 1, wherein said introducing of said polyethylene film is carried out subsequent to said impregnating step and prior to said convoluting step.

5. The method of claim 1, wherein said step of establishing friction comprises introducing a multilayer polyethylene film between the mat and the carrier.

6. The method of claim 5, wherein said convoluting step further comprises converting the multilayer film into a tubular body having axial ends extending beyond the shell and surrounding the carrier, and affixing the ends of the tubular body to the carrier to prevent unwinding of the tubular body during radial expansion of the carrier.

7. The method of claim 1, wherein said convoluting step further comprises converting the mat into a spiral having a plurality of turns.

8. The method of claim 7, wherein the spiral has a plurality of full turns plus a portion of a turn.

9. The method of claim 1, wherein the mat contains a plurality of overlapping layers of fibrous material and said convoluting step further comprises converting the mat into a spiral having a plurality of turns.

10. The method of claim 1, wherein said expanding step includes introducing into the carrier a fluid having a pressure which is a function of a plurality of parameters including the expansion of the carrier required to bias the shell against the conduit with a predetermined force and the fibrous material contained in the mat.

11. The method of claim 10, wherein another of said parameters includes a circumferential length of the convoluted mat.

12. The method of claim 1, wherein the fibrous material of the mat is selected form the group consisting of glass fibers, carbon filaments and aramid fibers.

13. The method of claim 1, wherein said impregnating step comprises applying the hardenable plastic compound over a plurality of layers of the fibrous material, superimposing the layers upon each other, confining the superimposed layers and the applied hardenable plastic compound in an envelope of polyethylene film, and applying to the envelope external forces to effect penetration of the hardenable plastic compound into the layers.

14. The method of claim 13, wherein the film of the envelope transmits light.

15. The method of claim 13, wherein said step of applying forces comprises manually spreading the plastic compound within the envelope with a rolling pin.

* * * * *